Figure 1:
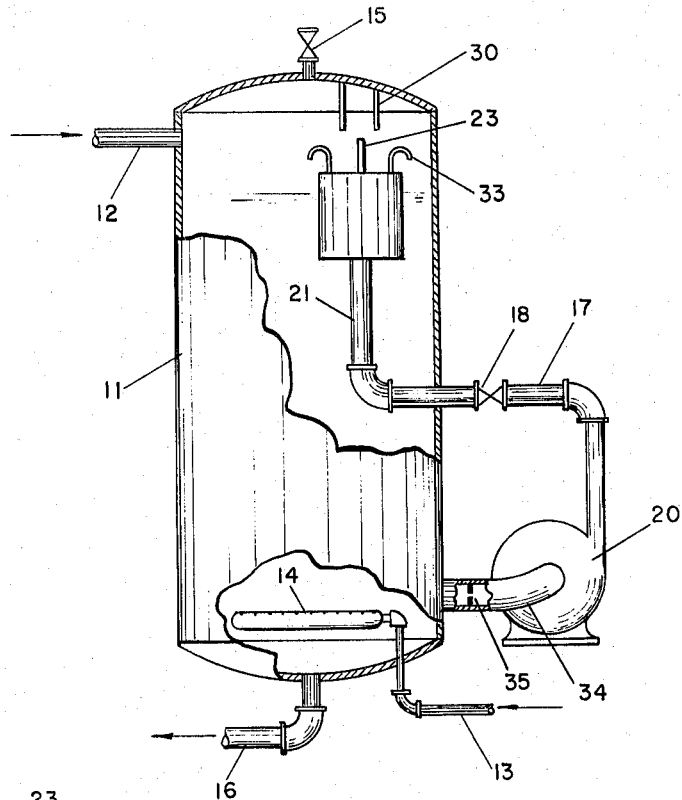

April 19, 1966   J. I. STEVENS   3,246,885
SATURATION TANK
Filed May 27, 1963

United States Patent Office 3,246,885
Patented Apr. 19, 1966

3,246,885
SATURATION TANK
James I. Stevens, Tucson, Ariz., assignor to Fuller Company, Borough of Catasauqua, Pa., a corporation of Delaware
Filed May 27, 1963, Ser. No. 283,278
6 Claims. (Cl. 261—29)

This invention relates to an apparatus for the dissolution of air into water under pressure and particularly to an improved air saturation tank of the type using recirculation.

It is an object of this invention to provide a simple and efficient apparatus for dissolving air in water which will maintain during operation a substantially constant air to water ratio in the recirculation system of a saturation tank.

Another object is to provide an apparatus of this general type whose operation will not be adversely affected by variations in the level of the liquid wherein air is to be dissolved.

Another object is to provide an apparatus of the type referred to which operates over a relatively wide range of liquid levels and does not require maintaining the liquid level at a fixed elevation.

Other objects of the invention will become apparent upon consideration of the detailed description and the claims which follow.

In liquid treating plants of the floation type, it is desirable that the air for floating suspended particles through the liquid to the surface be in the form of minute bubbles which attach themselves readily to the solid particles. Such minute air bubbles are obtained by dissolving air in water under pressure, and then suddenly reducing the pressure.

The term water is used herein to denote any kind of liquid wherein air under pressure can be dissolved preparatory to a flotation treatment, and the term air to denote any gas which can be dissolved in such liquids.

The water wherein air is to be dissolved may be all or part of the influent to the treating plant, or it may be part of the treated effluent of the flotation unit or water from another source. Regardless of the source of the water, the invention herein disclosed is applicable.

One way of dissolving air in water is to use a closed vessel ahead of the treating tank, wherein water and air are mixed under pressure. This can be done simply by forcing the air through a diffuser submerged in the water.

A method of enhancing air and water dissolution is by recirculation of the contents of the air saturation tank by means of a pump. In this method an air pocket is maintained under pressure in the top portion of the tank. A pump may withdraw liquid and air at the liquid-air interface and recirculate it back to the tank, or an ejector on the discharge side of a pump may be connected by a suction line to the air pocket, whereby air is sucked into, and mixed with, the flow of water through the ejector. The water-air mixture is then returned to the tank.

In both of these methods of recirculation, the level of the liquid in the tank must be carefully controlled because, if the water level were to rise significantly in either method, the inlet to the recirculation or suction line, respectively, would become entirely submerged and no air could be withdrawn.

In accordance with the invention, recirculation of an air-water mixture from an air saturation tank having an air pocket under pressure in the upper portion of the tank can be carried out in a simpler, more reliable manner by providing in the tank a floating air aspirator, which follows variations of the liquid level and maintains a constant air to water ratio in the flow going to the pump at all times. With this construction it is not necessary to provide expensive control devices to maintain the air and liquid interface in the tank at a fixed elevation.

My invention will be more readily understood by reference to the drawing, wherein like reference characters designate similar elements.

Figure 2:
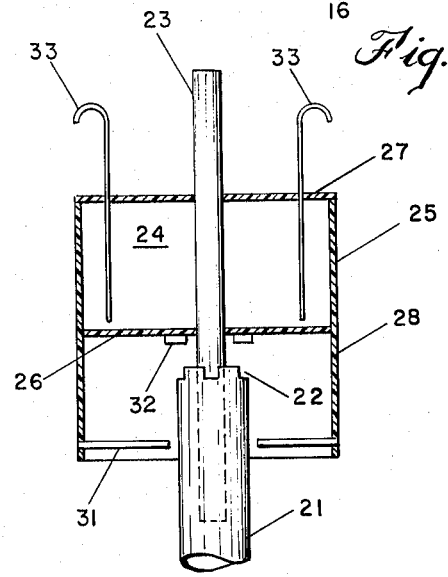

FIGURE 1 is a front elevational view, partly broken away, of an air saturation tank with a floating aspirator and associated recirculation pump according to the invention; and FIGURE 2 is an enlarged vertical sectional view of the floating aspirator.

Referring to the drawing, a closed pressure tank 11 is supplied with liquid through a pipe 12. An air supply line 13 leads from any suitable source of air under pressure, not shown, to the tank. Preferably the line 13 discharges to the lower portion of tank 11, so that some dissolution occurs as the air rises through the liquid in the tank. Line 13 may discharge the air directly into the tank, or, preferably, through an air diffuser of any conventional design, shown for purposes of illustration as a sparge ring 14, which distributes the air uniformly over the cross-sectional area of the tank. An air release valve 15 regulates the internal pressure of the tank. The valve 15 may be actuated by a conventional liquid level control of the float type, not shown, to maintain the level within the relatively wide range of operation of the apparatus. The water with dissolved air is removed from the tank by an outlet conduit 16.

A pipe 17 connects the tank 11 with the suction side of a pump 20, as shown. A manually controlled valve 18 may be provided on pipe 17 to permit variations of the ratio of water to air by different settings of the valve. The pipe 17 has a vertically extending portion 21 within the tank 11. The upper edge 22 of portion 21 is well below the predetermined minimum liquid level in the tank.

A tube 23 of a diameter less than that of pipe 21 extends with its lower end into the vertical portion 21 of pipe 17 and is vertically aligned with it. The tube 23 extends sufficiently deep into the portion 21 so that its end will always remain in said portion during operation within the predetermined range. The upper end of the tube 23 extends into the air pocket in the upper portion of the tank and, therefore, places pipe 21 in communication with the pressurized air.

The tube is floatably supported by liquid level responsive means of any suitable kind. These are shown for purposes of illustration in the form of a watertight air chamber 24 having a circumferential wall 25, a bottom 26 and a cover 27. The tube 23 extends through, and is affixed to, the air chamber 24 so that it rises and falls with it in response to variations in the liquid level.

The wall 25 of the air chamber 24 may be extended downwardly to form a shroud 28 surrounding the upper end of vertical portion 21, leaving a gap allowing liquid to flow into the shroud and over the upper edge of the vertical portion 21 and through pipe 17 to the pump 20. A stop and guide member 30 may be provided, as shown in FIGURE 1, to limit the upward travel of the air chamber and stabilize its vertical motion.

Extending radially inward from the lower end of the shroud are positioning pins 31, which guide the shroud and keep it in vertical position, so that the tube 23 remains vertically aligned with the portion 21 of pipe 17 during the travel of the air chamber. Radial ribs 32 may extend downward from the underside of the air chamber and keep the air chamber in its lowermost position from being drawn down onto pipe 21, where it would prevent flow of liquid into the pipe.

Instead of using the ribs 32, the upper edge of pipe 21 can be formed with notches, which will permit flow into the pipe 17, should the air chamber seat on the pipe.

Extending from an elevation from near the bottom 26 of the air chamber and through the cover 27 are vent tubes 33. By venting the chamber the walls of the chamber can be constructed of much lighter material, as they need not withstand a pressure differential. The vent tubes 33 are U-shaped at their upper ends to prevent water seepage into the air chamber and consequent loss of buoyancy. Should any water happen to collect in the air chamber, then it can be forced out by alternately pressurizing and depressurizing the tank.

The shroud, air chamber, and tube may be constructed of any suitable material. In tests a plastic material of the acrylic resin type, such as sold by Du Pont under the tradename Lucite, was found to be satisfactory.

A return line 34 leads from the discharge side of pump 20 to a lower portion of the tank. An orifice 35 may be provided in line 34 and a conventional flow measuring device, not shown, be connected to line 34 upstream and downstream of the orifice. The flow measuring device will also provide a somewhat crude means for continuously checking the proper functioning of the aspirator. A fluctuating reading will indicate that air is being dissolved into the water, while a steady reading indicates lack of aspiration of air.

In operation, the pump 20 is started, causing a flow of water into the open end of pipe 17. This flow results in a suction effect at the lower end of tube 23. Consequently, air is aspirated from the air pocket in the tank through the tube 23 and is admixed with and dissolved in the water flowing through the pipe 17. The pump causes further mixing of the liquid and air. The mixture is returned to the tank through pipe 34. Liquid with air dissolved therein is withdrawn from the tank through the outlet conduit 16.

Should any variations in water level occur, then the floating aspirator will automatically rise or fall with the water level. The tube is so dimensioned relative to the possible travel of the floating air chamber that it will be within the portion 21 of pipe 17 with its lower end and in connection with the air pocket with is upper end for all positions of the air chamber. The water to air ratio will, therefore, be maintained constant and will be unaffected by variations in the water level. The apparatus maintains a constant air to water ratio over a wide range of liquid level variations. Close control of the liquid level in the tank is eliminated, and, consequently, expensive controls are not required.

I claim:

1. In an apparatus for the dissolution of air into water under pressure of the type including a closed pressure tank having inlet means for supplying liquid and for air under pressure to be dissolved in the liquid, and outlet means for liquid with dissolved air, a recirculatng pump outside of said tank, a suction pipe connecting said tank to the suction side of said recirculating pump, and a return pipe connecting the discharge side of said pump to said tank, means for maintaining a constant ratio of water to air in the flow to said recirculation pump, comprising a vertical pipe within said tank connected with its lower end to said suction pipe and having an upper end below the predetermined minimum liquid level in said tank, means responsive to the liquid level in said tank, a tube of diameter less than the diameter of said vertical pipe affixed to, and movable with, said liquid level responsive means, said tube having its lower end in said vertical pipe and its upper end above the liquid level in all positions of said liquid level responsive means, whereby said vertical pipe is in communication with the air in the upper portion of the tank and liquid flowing through said vertical pipe causes aspiration of air from said upper portion of the tank, and means for guiding movement of said liquid level responsive means so that it maintains said tube in alignment with said vertical pipe.

2. The apparatus of claim 1, wherein said means responsive to the liquid level in said tank comprises a buoyant air chamber having a bottom, a top and a circumferential wall, said tube extending through and being affixed to said air chamber in such manner that its lower end is within said vertical pipe and its upper end above the liquid level in all positions of said air chamber, and wherein said means guiding movement of said liquid level responsive means comprises a downward extension of said circumferential wall to an elevation below the bottom of said air chamber and surrounding the upper end of said vertical pipe, and a plurality of fins extending radially inward from the lower end of said extension toward said vertical pipe.

3. The apparatus of claim 2, including also ribs mounted on the underside of said air chamber to prevent seating of said air chamber in its lowermost position on said vertical pipe.

4. The apparatus of claim 2, wherein the upper edge of said vertical pipe is notched.

5. The apparatus of claim 2, including stop means positioned to engage said air chamber so as to limit and guide its upward travel.

6. The apparatus of claim 2, including vents leading from a lower portion of said air chamber upward to an elevation above the normal maximum liquid level in said tank, the upper end of each vent having a return bend.

References Cited by the Examiner

UNITED STATES PATENTS 3,113,698   12/1963   Abplanalp _____ 137—154 X
3,175,687   3/1965   Jones _____ 210—44 X HARRY B. THORNTON, *Primary Examiner.*